US008812212B2

(12) United States Patent
Tomlinson et al.

(10) Patent No.: US 8,812,212 B2
(45) Date of Patent: Aug. 19, 2014

(54) SYSTEM AND METHOD FOR CORRECTING BRAKE KNOCKBACK IN A VEHICLE

(75) Inventors: Charles M. Tomlinson, Southfield, MI (US); Steven J. Weber, Mount Clemens, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1376 days.

(21) Appl. No.: 12/164,187

(22) Filed: Jun. 30, 2008

(65) Prior Publication Data

US 2009/0326776 A1 Dec. 31, 2009

(51) Int. Cl.
*B60T 13/66* (2006.01)
*B60T 17/22* (2006.01)

(52) U.S. Cl.
CPC ............. *B60T 17/221* (2013.01); *B60T 13/662* (2013.01)
USPC .............................................. 701/72; 701/78

(58) Field of Classification Search
USPC .......... 701/71, 72, 78, 70; 303/3, 15, 11, 177, 303/199
See application file for complete search history.

(56) References Cited

U.S. PATENT DOCUMENTS

| | | | | |
|---|---|---|---|---|
| 4,289,216 A | * | 9/1981 | Shirai et al. ................... | 188/72.2 |
| 5,651,431 A | * | 7/1997 | Kyrtsos ..................... | 188/1.11 L |
| 7,695,075 B1 | * | 4/2010 | Mackiewicz .................. | 303/191 |
| 2003/0132665 A1 | * | 7/2003 | Koyama ....................... | 303/116.1 |
| 2004/0026988 A1 | * | 2/2004 | Ewinger et al. ................. | 303/89 |
| 2005/0239598 A1 | * | 10/2005 | Bauerle et al. ................. | 477/111 |
| 2006/0015239 A1 | * | 1/2006 | Higuchi .......................... | 701/72 |
| 2006/0158025 A1 | * | 7/2006 | Christensen et al. ............. | 303/7 |
| 2006/0267401 A1 | * | 11/2006 | Nishio et al. ..................... | 303/11 |
| 2007/0024115 A1 | * | 2/2007 | Nomura et al. ................ | 303/187 |
| 2007/0114838 A1 | * | 5/2007 | Bitz ................................ | 303/11 |
| 2007/0213920 A1 | * | 9/2007 | Igarashi et al. ............... | 701/114 |
| 2008/0048596 A1 | * | 2/2008 | Konishi et al. ................ | 318/372 |
| 2008/0058162 A1 | * | 3/2008 | Schmidt ........................ | 477/184 |
| 2009/0012690 A1 | * | 1/2009 | Trotter et al. .................... | 701/83 |

FOREIGN PATENT DOCUMENTS

JP 2005067245 A * 3/2005 ............... B60T 8/32

* cited by examiner

*Primary Examiner* — Anne Marie Boehler
*Assistant Examiner* — Maurice Williams
(74) *Attorney, Agent, or Firm* — Lionel D. Anderson; Reising Ethington P.C.

(57) ABSTRACT

A system and method for correcting brake knockback in a vehicle disk brake system. Brake knockback can occur when a vehicle is driven through an aggressive turn or in other environments that exert a significant amount of lateral force on the vehicle's wheels. This can cause the rotors to deflect and push brake pistons into retracted positions, where they remain even after the vehicle exits the turn. According to one embodiment, the present method first estimates or predicts brake knockback by using lateral acceleration readings from the vehicle and a brake knockback model, and then corrects brake knockback by generating command signals for a hydraulic pump.

19 Claims, 3 Drawing Sheets

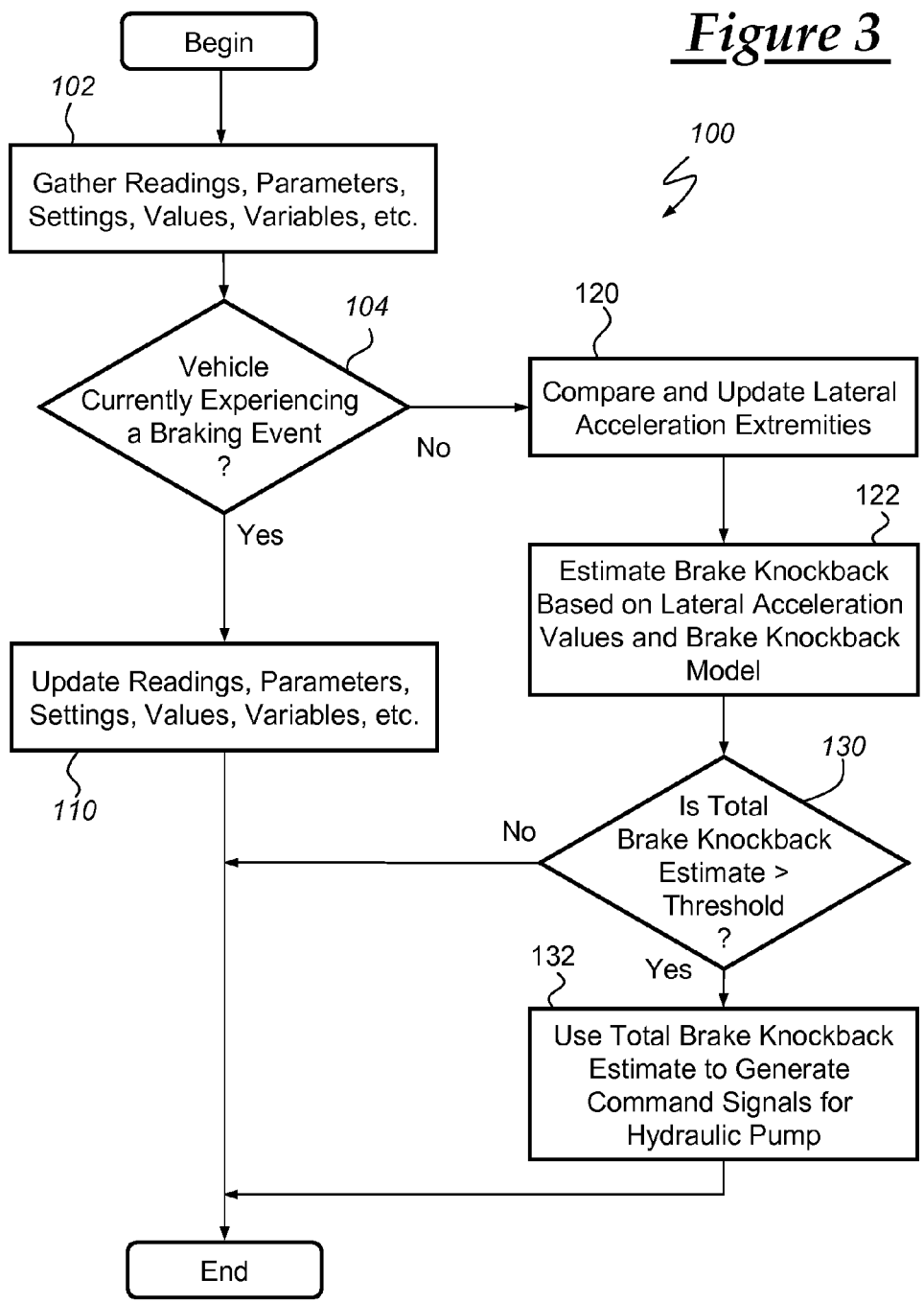

SYSTEM AND METHOD FOR CORRECTING BRAKE KNOCKBACK IN A VEHICLE

TECHNICAL FIELD

The present invention generally relates to vehicle disk brakes and, more particularly, to systems and methods that correct brake knockback in vehicle disk brakes.

BACKGROUND

Brake knockback is a phenomenon that can occur when a vehicle is driven through an aggressive turn, is engaged in aggressive maneuvers, or is otherwise driven in an environment where significant lateral forces are exerted on the vehicle's wheels. This can cause an angular deflection of the rotor, which in turn pushes against the brake pads and forces one or more brake pistons into retracted positions. When the vehicle exits the turn, if the brake pistons remain in retracted positions, then they will require additional brake pedal engagement the next time the driver engages the brakes. The additional brake pedal engagement or pedal travel can be noticeable and undesirable to the driver.

One approach for addressing brake knockback is to design vehicle wheel assemblies, particularly the hubs and related components, that are oversized and thus stiffer. Although, larger and stiffer wheel assemblies can sometimes reduce the angular deflection of the rotor, such components can be more costly to manufacture and heavier on the vehicle. This can be of particular concern when they are used on high-performance vehicles.

SUMMARY OF THE INVENTION

According to one embodiment, there is provided a system for correcting brake knockback in a vehicle, comprising a sensor, an electronic module, and a hydraulic pump. Wherein, the electronic module uses a lateral acceleration signal from the sensor to predict brake knockback and uses a command signal to the hydraulic pump to correct brake knockback.

According to another aspect, there is provide a method for correcting brake knockback in a vehicle. The method comprises the steps of: (a) receiving lateral acceleration readings; (b) comparing the lateral acceleration readings to a brake knockback model, and estimating brake knockback based on the results of this comparison; and (c) using the estimated brake knockback to generate a command signal for a hydraulic pump.

BRIEF DESCRIPTION OF THE DRAWINGS

Preferred exemplary embodiments of the invention will hereinafter be described in conjunction with the appended drawings, wherein like designations denote like elements, and wherein:

FIG. 3 is a flowchart of an exemplary method that can be used with the disk brake control system of FIG. 2.

DETAILED DESCRIPTION OF THE PREFERRED EMBODIMENTS

Brake knockback, or pryback as it is sometimes called, can occur when a vehicle is driven through an aggressive turn or in other environments that exert a significant amount of lateral force on the vehicle's wheels, as previously explained. According to one embodiment, the system and method described herein correct this phenomenon by first estimating and then compensating for brake knockback, as will be explained in more detail.

Figure 1A:
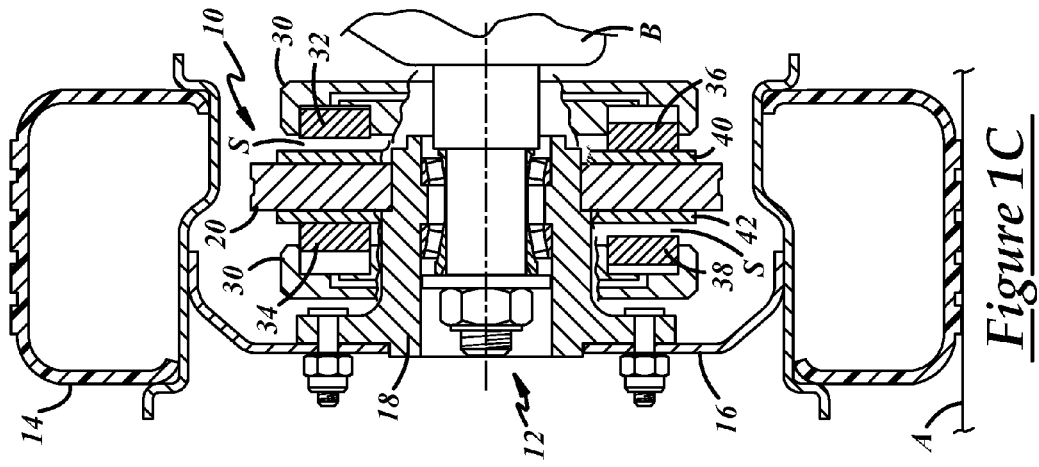
FIG. 1A is a sectional view of an exemplary disk brake system mounted on a wheel assembly, wherein the wheel assembly is experiencing little or no lateral forces.

With reference to FIG. 1A, there is shown a sectional view of an exemplary disk brake system 10 mounted to a wheel assembly 12 where the vehicle is experiencing little to no lateral forces; e.g., when a vehicle is driven on a strait-away or other flat road surface. It should be appreciated that the system and method described herein could be used in a variety of applications, and are not limited to the exemplary embodiments described below. For example, the present system and method could be used with the front or rear wheels of a vehicle employing rear-wheel-drive, front-wheel-drive, all-wheel-drive, four-wheel-drive, anti-lock braking systems (ABS), and electronic traction and/or stability control, to name but a few possibilities.

The wheel assembly 12 shown in FIG. 1A can be mounted to the front of a vehicle and generally includes a tire 14, a wheel 16, a hub 18, and a rotor 20. Tire 14 is mounted on wheel 16 and is designed to contact a road surface A, as is widely understood in the art. Wheel 16 is securely attached to hub 18 with several lug nuts so that the tire, wheel, hub, and rotor can all co-rotate together. Rotor 20 is generally a disk-shaped component located inboard of wheel 16 and, depending on the particular application, can be cast or otherwise formed from a variety of materials including different metal alloys, ceramic composites, and other suitable materials known in the art. Hub 18 carries the tire, wheel, and rotor and is rotatably mounted to one or more bearing devices, as is widely known in the art. Again, it should be understood that disk brake system 10 and wheel assembly 12 are merely exemplary, as the system and method described herein could be used with one of a number of different embodiments and are not limited to the specific examples shown in the drawings.

Figure 1B:
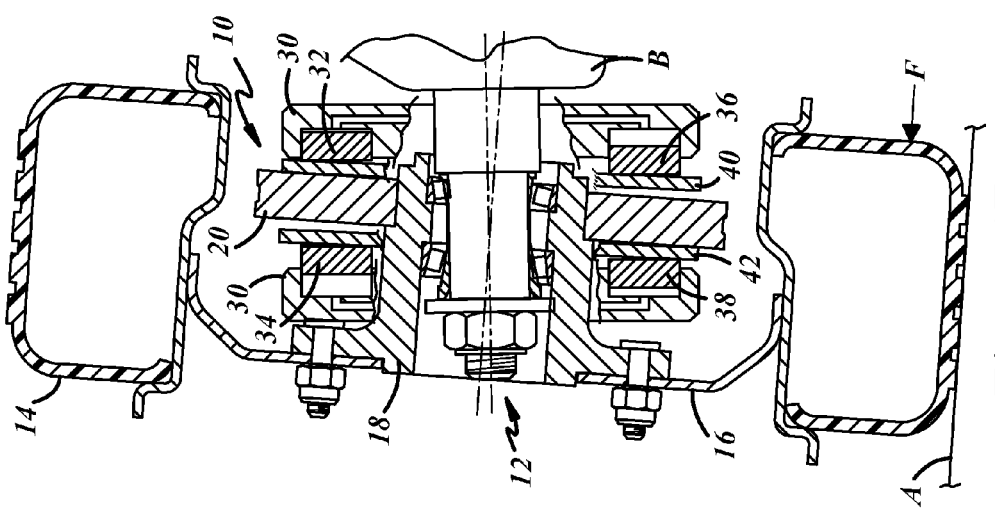
FIG. 1B is a sectional view of the disk brake system from FIG. 1A, wherein the wheel assembly is experiencing significant lateral forces such as those generated in an aggressive turn.
Figure 1C:
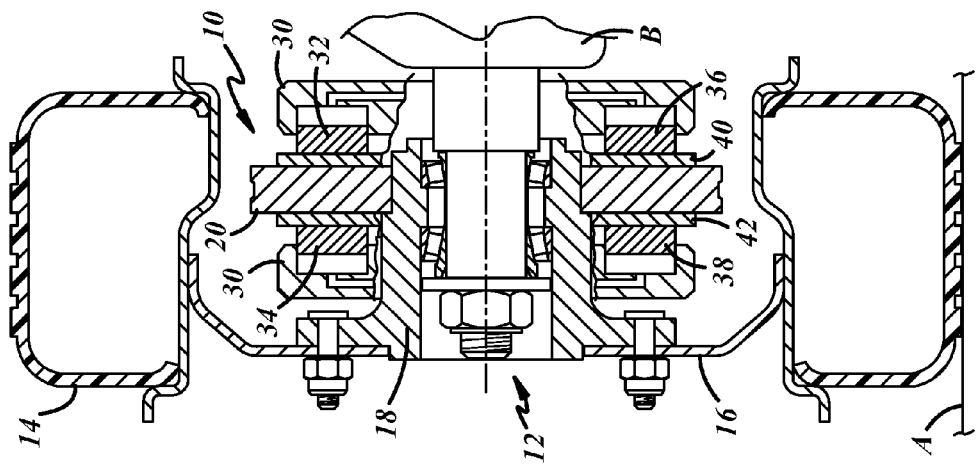
FIG. 1C is a sectional view of the disk brake system from FIGS. 1A and 1B, wherein the vehicle has exited the turn but a brake knockback condition has occurred.

Disk brake system 10 is mounted to a vehicle structure B so that it can interact with components of wheel assembly 12 and, according to this particular embodiment, includes a brake caliper 30, brake pistons 32-38, and brake pads 40, 42. Brake caliper 30 generally straddles rotor 20 and carries brake pistons 32-38 so that a compressive and frictional force can be applied by brake pads 40, 42 to opposing sides of the rotor during a braking event. The frictional forces slow rotation of rotor 20 and hence rotation of the tire, wheel, hub, and ultimately the vehicle. Different types of brake calipers can be used, including fixed calipers and floating calipers. A fixed caliper, which is shown in FIGS. 1A-C, is fixedly mounted to the vehicle structure B and generally does not move with respect to rotor 20. A floating or sliding caliper, on the other hand, moves to and from rotor 20 during braking operations.

More specifically, an inner brake piston moves an inner brake pad until it contacts an inner side of the rotor. Additional compressive force by the inner brake piston pulls a floating outer caliper component and brake pad towards the outer side of the rotor until it make contact and creates a frictional force that slows rotation of the wheel.

Brake pistons 32-38 are mounted to brake caliper 30 and generate compressive forces that drive brake pads 40, 42 against opposing sides of rotor 20. The brake pistons shown here are coupled to a master hydraulic cylinder and are hydraulically activated, but it should be appreciated that other types of brake piston embodiments, including pneumatic and electromagnetic embodiments, could also be used. The exemplary embodiment in FIG. 1A shows four separate brake pistons 32-38 mounted to a single fixed brake caliper 30—i.e., a four-pot caliper—but brake calipers having more or less than four brake pistons could be used instead. For example, it is possible to use a fixed brake caliper having up to twelve brake pistons, or a floating brake caliper having only a single brake piston, to cite two possibilities.

Inner and outer brake pads 40, 42 are designed to frictionally interact with the inner and outer sides of rotor 20, respectively. According to this particular embodiment, inner brake pad is driven by brake pistons 32 and 36, and outer brake pad is engaged by brake pistons 34 and 38. There are numerous types of brake pad designs, materials, arrangements, etc. that could be used. For example, the two-pad arrangement shown in FIG. 1A could be replaced with a high-performance alternative that utilizes more than two brake pads per wheel.

Turning now to FIG. 1B, there is shown the exemplary disk brake system 10 from FIG. 1A, except that wheel assembly 12 is experiencing significant lateral forces F that can lead to brake knockback in the system. As is demonstrated in FIG. 1B, lateral forces F are translated to rotor 20 and cause it be angularly deflected, relative to brake pads 40, 42. That is, the rotor is not parallel to the opposing brake pads, as it generally was in FIG. 1A. The deflected portions of rotor 20, especially those toward the outer circumference of the rotor, exert forces against brake pads 40, 42 which pushes them back against brake pistons 32 and 38 and urges them into retracted positions. For example, the upper portion of rotor 20 is deflected inward towards the vehicle structure B so that brake piston 32 is compressed more than brake piston 36. Similarly, the lower part of the rotor is angularly deflected outwards away from the vehicle structure. This results in brake piston 38 being pushed back or retracted more than brake piston 34. If the brake pistons are pushed back far enough, then piston seals may not return the brake pistons to their original, pre-knockback position once the vehicle exits the turn. This situation is demonstrated in FIG. 1C.

FIG. 1C is a schematic illustration of the of the disk brake system 10 from FIGS. 1A and 1B, once the vehicle has exited the turn and the lateral forces F have abated. As is shown, brake pistons 32 and 38 remain in retracted or compressed positions so that a substantial space S exists between those brake pistons and brake pads 40, 42. The next time the brakes are manually or automatically applied—i.e., the next braking event—additional hydraulic pressure will be required to reseat brake pistons 32 and 38 against brake pads 40 and 42, respectively, before enough brake pressure is developed to decelerate the vehicle. If the braking event is a manual braking event, then the driver may notice the additional brake pedal travel required to generate the extra hydraulic pressure. Generally, brake knockback can occur in disk brake systems having either fixed or floating calipers, but it is usually more prevalent in fixed caliper designs.

Figure 2:
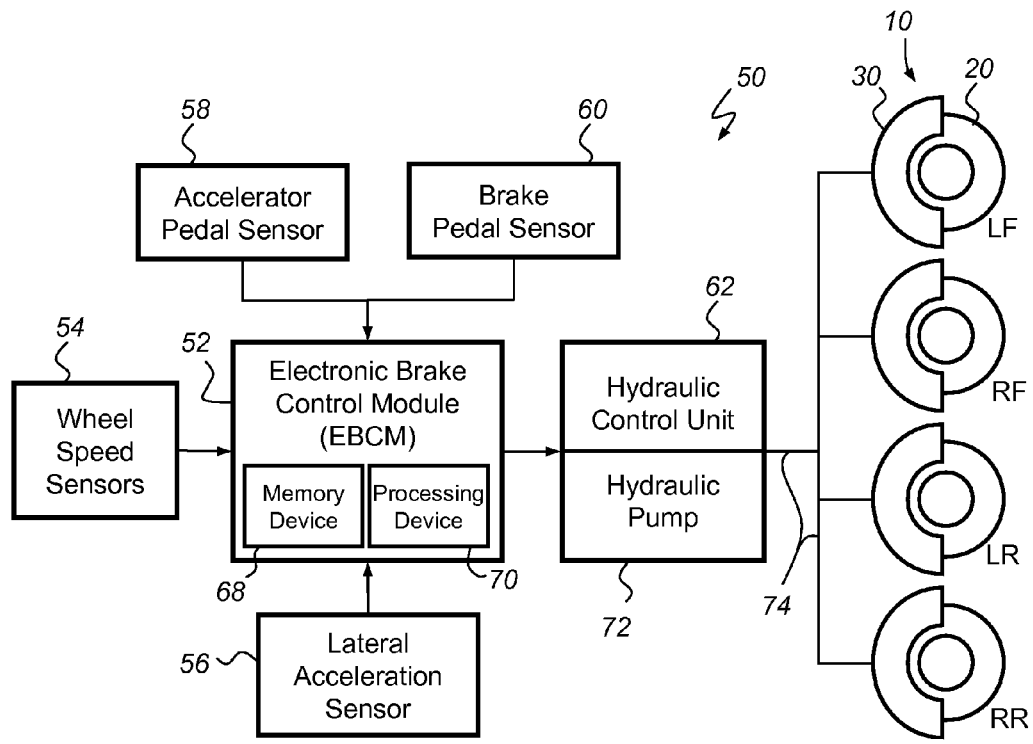
FIG. 2 is a block diagram of an exemplary disk brake control system that can be used with the disk brake system of FIGS. 1A-C.

FIG. 2 is a block diagram of an exemplary disk brake control system 50 that is located on the vehicle and can control the disk brakes for each of the wheels. According to this exemplary embodiment, disk brake control system 50 generally includes an electronic module 52, wheel speed sensors 54, lateral acceleration sensor 56, accelerator pedal sensor 58, brake pedal sensor 60, and hydraulic control unit 62. It should be appreciated that disk brake control system 50 is simply provided for purposes of illustration and that various alternative arrangements, including control systems having more, less, or different components from those shown here, could also be used. For example, disk brake control system 50 could further include any sensor or device capable of providing information relating to speed, acceleration, deceleration, braking conditions, driver braking intent, or any other braking-related matter concerning the vehicle.

Electronic module 52 is a device or unit that is located in the vehicle and includes an electronic processing device to control the operation of the vehicle's brakes by executing various electronic instructions, including those of the present method. According to one embodiment, electronic module 52 is an electronic brake control module (EBCM) that modulates brake pressure via a command signal to a hydraulic control unit 62. EBCM 52 can include a memory device 68, an electronic processing device 70 (e.g., a digital or analog microprocessor, microcontroller, application specific integrated circuit (ASIC), or any other processing device known in the art), as well as inputs, outputs, and any other suitable componentry. EBCM 52 could be a separate electronic module or it could be integrated into a larger module, device, or system, such as a body control module. Because the individual hardware components and the overall arrangement of an EBCM is generally known in the art, a detailed description of such has been omitted here.

Each of the wheel speed sensors 54 is operably coupled to one of the vehicle's wheels and provides a wheel speed signal to EBCM 52 that is representative of the rotational speed of that wheel. According to an exemplary embodiment, a wheel speed sensor 54 generally includes a stationary pickup component affixed to the vehicle and a rotating electromagnetic component that spins past the pickup component. The stationary pickup component detects each passage of the rotating electromagnetic component and generates a wheel speed signal accordingly. The wheel speed signal can be directly sent to EBCM 52 or it can be sent to the EBCM via one or more intermediary components, devices, modules, etc. It should be appreciated that other types of wheel speed sensors could be used instead, including those that are optical, mechanical, or based on some other technology known or used in the art.

Lateral acceleration sensor 56, also called a lateral accelerometer or inertial sensor, is an electronic sensor that is mounted in the vehicle and measures the acceleration of the vehicle in a lateral or side-to-side direction. Lateral acceleration sensor 56 can provide EBCM 52 with a lateral acceleration signal over a vehicle communications network, such as a private controller area network (CAN) bus or high-speed local area network (LAN), or any other suitable communications means known in the art. Any sensor, component, device, etc. that provides EBCM 52 with a signal that includes information regarding the lateral acceleration of the vehicle could be used, including stand alone sensors and those integrated into other systems or modules.

Accelerator pedal sensor 58 and brake pedal sensor 60 are operably coupled to the accelerator and brake pedals, respectively, and provide EBCM 52 with separate electronic signals representative of the state and/or position of those two pedals.

The accelerator or gas pedal sensor 58 provides an accelerator pedal signal, and the brake pedal sensor 60 provides a brake pedal signal. In one embodiment, the accelerator and/or brake pedal sensors 58, 60 include a pedal switch that simply indicates whether or not the corresponding pedal is engaged; this type of sensor does not provide an actual position reading for the pedal, rather it indicates whether or not the pedal has been depressed past a certain point. In another embodiment, the accelerator and/or brake pedal sensors 58, 60 include componentry (e.g., a Hall-effect devices, piezo-electric devices, potentiometers, as well as other sensor types known in the art) that determines the actual position of the pedals. In any case, the accelerator and brake pedal signals can be sent from the sensors to EBCM 52 via a vehicle communications network, such as a private controller area network (CAN) bus or high-speed local area network (LAN), or any other suitable communications medium.

Hydraulic control unit 62 is mounted in the vehicle and controls a hydraulic pump 72 that pressurizes hydraulic fluid which can drive brake pistons 32-38, as previously mentioned. Although the hydraulic control unit 62 and hydraulic pump 72 are schematically shown here as being separate devices that are attached to one another, it should be appreciated that these two devices could instead be integrated into a single unit, they could be separated from one another and connected by some type of communication means (e.g., the hydraulic control unit could be integrated within the EBCM or some other module), or they could be arranged according to some other arrangement known in the art. In an exemplary embodiment, hydraulic control unit 62 receives command signals from EBCM 52 and drives hydraulic pump 72 accordingly. The brake pistons of the different wheels can be: all controlled in unison, controlled on a wheel-by-wheel basis, controlled in groups (e.g., the front wheels are controlled separately from the rear wheels), or controlled according to some other known method. The hydraulic control unit 62 can be electronically connected to EBCM 52 via a direct electronic connection, a vehicle communications network like a private controller area network (CAN) bus or high-speed local area network (LAN), or with some other communications medium.

In general operation, EBCM 52 receives inputs from various sensors, including sensors 54-60, processes the inputs according to one or more braking algorithms, and outputs command signals to hydraulic control unit 62. Hydraulic control unit 62 controls hydraulic pump 72 according to the command signals and modulates the hydraulic fluid pressure in supply lines 74 that lead to the different disk brake systems for each of the vehicle's wheels. As mentioned above, the different disk brake systems can be controlled individually, can be controlled in groups (e.g., front wheels, rear wheels, etc.), or they can be controlled all together, to name a couple of possibilities. In response to an increase in the hydraulic fluid pressure, the brake pistons extend outwards and push the brake pads against the rotors so that a frictional stopping force is created therebetween. At the end of the braking event, the hydraulic control unit 62 reduces the hydraulic fluid pressure in supply lines 74 so that the brake pads can back off the rotors slightly.

If the disk brake system experiences brake knockback, then the pistons become retracted from the corresponding brake pad. The next time a manual braking event occurs, the driver will need to push the brake pedal through an additional amount of pedal travel so that enough hydraulic pressure can be built to restore the brake pistons to their seated positions before the brake pads compress the rotor with a stopping force.

Turning now to FIG. 3, there is shown a flowchart of an exemplary embodiment 100 of a method that can correct the brake knockback phenomenon described above. Generally speaking, method 100 uses the lateral acceleration signal and a brake knockback model to predict brake knockback, and then uses the command signal and the hydraulic pump to correct brake knockback. Although the following description makes reference to disk brake system 10, it should be appreciated that it equally applies to the disk brake systems of the other wheels as well.

Beginning with step 102, the method gathers one or more readings, parameters, settings, values, variables, etc. from various sources around disk brake control system 50 and/or the vehicle at large. For example, a lateral acceleration reading can be obtained from lateral acceleration sensor 56, pedal position readings indicative of the accelerator and brake pedal positions can be respectively gathered from accelerator and brake pedal sensors 58 and 60, and one or more wheel or vehicle speed readings can be provided by wheel speed sensors 54 or elsewhere. Likewise, a variety of settings such as an electronic stability control (ESC) setting indicating the status of the vehicles' ESC features and an anti-lock brake system (ABS) setting reflecting the status of the ABS, could also be gathered or otherwise determined in this step. Information in addition to or in lieu of the preceding examples could also be gathered. For information like the lateral acceleration readings, which can experience undesirable levels of noise, a variety of filtering or other signal processing techniques can be employed to improve the quality of the input signal. One suitable filtering technique that is known in the art is a calibratable first-order low-pass filter, however, others could be used as well.

Next, step 104 determines if the vehicle is currently experiencing a braking event, either manual or automatic. For example, if the driver is manually engaging the vehicle's brakes, then a vehicle braking event is currently in progress (this could be determined by one of a number of different techniques, including the use of the previously gathered brake pedal position and/or wheel speed readings). Other examples of vehicle braking events include automatic applications of the vehicle's brakes by one or more systems in the vehicle like the ABS (automatic braking events can be determined, for example, by using the ESC and ABS settings previously established). Other techniques known in the art, like determining if the vehicle is decelerating, etc., could also be used.

If a braking event is in progress, then one or more readings, parameters, settings, values, variables, etc. are updated and/or established, step 110. As an example, a lateral acceleration reference value can be established by saving the lateral acceleration reading obtained in step 102. It is assumed that brake pistons 32-38 and brake pads 40-42 are properly seated during a braking event, thus, the lateral acceleration reference value established in this step generally represents the lateral acceleration during the last known time that the components of disk brake system 10 were properly seated and not experiencing any type of brake knockback. The lateral acceleration reference value is used until a subsequent braking event is detected, at which time a new lateral acceleration reference value is established. The lateral acceleration reference value can be used by method 100 to help estimate or predict the amount of brake knockback, as will be explained. Because it is assumed that there is no brake knockback during a braking event, an estimated knockback value can be set to zero in this step.

Assuming that a braking event is not detected, step 120 updates lateral acceleration extremities. In between braking events, method 100 keeps track of 'lateral acceleration extremities' which represent the greatest lateral accelerations experienced in a first lateral direction (e.g., in a driver's side direction) and the greatest lateral accelerations experienced in a second lateral direction (e.g., a passenger's side direction). The greatest lateral acceleration in the first direction is hereafter referred to as the 'first lateral acceleration extremity' and the greatest in the second direction is hereafter referred to as the 'second lateral acceleration extremity'. It is assumed that these extreme lateral acceleration or g-force conditions are likely to produce the most brake knockback, thus, these extremities are recorded for subsequent modeling and analysis purposes, as will be explained. According to an exemplary embodiment, step 120 compares current lateral acceleration readings obtained in step 102 with first and second lateral acceleration extremities saved in memory. If the current values are beyond either extremity, then step 120 updates the new lateral acceleration extremities accordingly. If the current values are within the two extremities, then no change is made to the first and second lateral acceleration extremities and the current lateral acceleration values are generally ignored. Each time a new braking event occurs, the previous lateral acceleration extremities are cleared.

In addition, step 120 can update a lateral acceleration reference value. As previously explained, this reference value generally represents the lateral acceleration of the vehicle during the last time that the brake pistons and pads were thought to be properly seated; i.e., the last braking event. Thus, step 120 can refer to memory device 68 or elsewhere to acquire the last saved lateral acceleration reference value. Any other readings, parameters, settings, values, variables, etc. that are needed for model 150 could also be gathered or otherwise obtained during this step.

Figure 4:
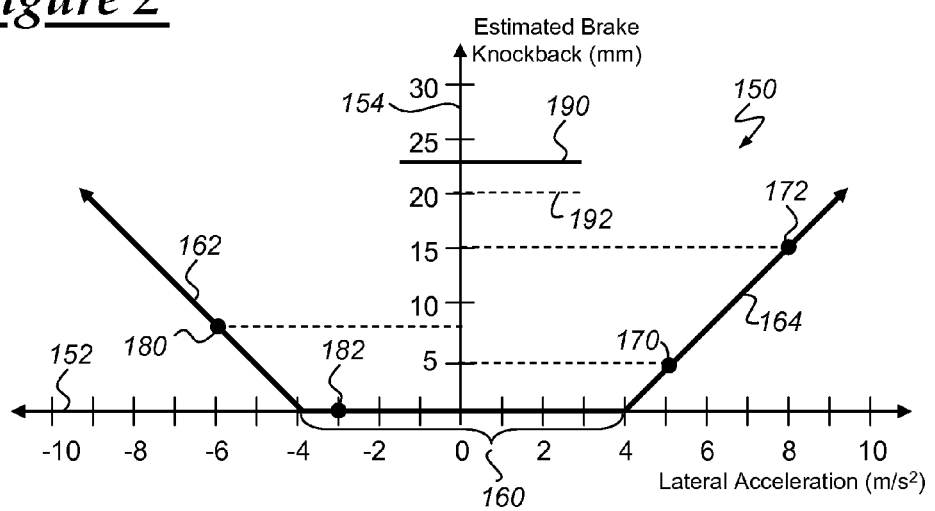
FIG. 4 is a graph illustrating an exemplary embodiment of a brake knockback model that can be used with the method of FIG. 3.

Step 122 estimates the amount of brake knockback based on one or more lateral acceleration values and a brake knockback model. In an exemplary embodiment illustrated in FIG. 4, a brake knockback model 150 is used to estimate the amount or degree of knockback in the brakes. Model 150 is plotted on a graph having lateral acceleration ($m/s^2$) on an x-axis 152 (lateral acceleration in a first or driver's side direction is represented as a negative x-axis value and lateral acceleration in a second or passenger's side direction is represented as a positive x-axis value), and estimated brake knockback (mm of additional brake pedal travel) on a y-axis 154. Model 150 generally predicts brake knockback as a function of lateral acceleration, and includes a flat segment 160 and first and second sloped segments 162, 164. The lateral acceleration reference value mentioned above corresponds to zero on the x-axis and generally acts as a frame of reference for the other lateral acceleration values. It follows that model 150 has an estimated brake knockback value of zero at the lateral acceleration reference value because it is assumed that there is no brake knockback during a braking event. Additional explanation of the exemplary graph in FIG. 4 is provided by way of the following example.

Assume that a vehicle just finished a braking event, and goes on to make two right-hand turns and two left-hand turns without engaging the brakes. A lateral acceleration of +1 $m/s^2$ was experienced during the recent braking event and now serves as the lateral acceleration reference value (zero point on the x-axis). During the first right-hand turn, a lateral acceleration reading of +6 $m/s^2$ is taken. Because the reference value is at +1 $m/s^2$, the first turn has a relative lateral acceleration value of +5 $m/s^2$ (+6 $m/s^2$-+1 $m/s^2$=+5 $m/s^2$); i.e., the difference or delta between the two values is 5 $m/s^2$. This results in an estimated brake knockback value of approximately 5 mm; represented by point 170 on the curve. Since this is the first lateral acceleration value measured since the last braking event, it is saved as a lateral acceleration extremity (for right-hand or passenger-side turns, this is the 'second lateral acceleration extremity'). In a second right-hand turn, which is a rather aggressive turn, the vehicle experiences a lateral acceleration of +9 $m/s^2$ which has a relative value of +8 $m/s^2$ (point 172 on the curve) and corresponds to approximately 15 mm of estimated brake knockback. Because this lateral acceleration is greater in magnitude than the previous lateral acceleration, point 172 (+8 $m/s^2$) becomes the new second lateral acceleration extremity and point 170 is ignored. It is possible, however, to also save point 170 for additional analysis.

The first left-hand or driver's-side turn generates a lateral acceleration of −5 $m/s^2$, which has a relative value of −6 $m/s^2$ (−5 $m/s^2$−+1 $m/s^2$=−6 $m/s^2$) and an estimated brake knockback of approximately 8 mm. This reading corresponds to point 180 on the curve. Again, because this is the first lateral acceleration value measured in this direction it is saved as the 'first lateral acceleration extremity'. The second right-hand turn is a rather gentle turn and has a measured lateral acceleration of −2 $m/s^2$—i.e., a relative value of −3 $m/s^2$—and corresponds to point 182. Because the second left-hand turn is not greater than the first left-hand turn in magnitude or absolute value, point 182 can be ignored and point 180 remains the first lateral acceleration extremity. It is worth noting that point 182 falls along flat segment 160, which is a section of brake knockback model 150 that is also referred to as the dead band and is flat to account for give in the seals of the brake pistons, etc. Put differently, model 150 assumes that small lateral accelerations will either not result in brake knockback or will result in such little knockback that it won't be discernable to the driver, thus, the dead band surrounding the lateral acceleration reference value.

A total brake knockback estimate 190 is determined by adding the contributions of the first and second lateral acceleration extremities together. In the example above, the first lateral acceleration extremity (point 180) contributes an estimated 8 mm of brake knockback, and the second lateral acceleration extremity (point 182) contributes an estimated 15 mm of brake knockback. Their summed contributions result in a total brake knockback estimate of 23 mm. The total brake knockback estimate can be determined following each turn or maneuver, or according to some other frequency.

With reference to FIGS. 3 and 4, step 130 determines if the total brake knockback estimate just calculated is greater than a threshold 192. If the total brake knockback estimate is less than threshold 192, then method 100 determines that a brake correction is not needed and the method ends. If, on the other hand, the total brake knockback estimate 190 (23 mm in the example above) exceeds threshold 192 (20 mm in the example), then step 132 applies one of a variety of correction actions to restore proper piston/pad contact. In an exemplary embodiment, the corrective action includes using the total brake knockback estimate to generate command signals for controlling hydraulic pump 72. These command signals can be sent from EBCM 52 to hydraulic control unit 62 for subsequent processing, they can be sent from the EBCM directly to hydraulic pump 72, or they can be sent from the EBCM to the some other intermediary device, motor driver, piece of software, etc. The hydraulic pump then generates enough hydraulic fluid pressure (e.g., 1.0-3.0 bars) to reestablish proper piston/pad contact, but not so much fluid pressure to result in an significant deceleration of the vehicle that is objectionable to the driver. It should be understood that other corrective actions, in addition to or in lieu of generating command signals for a hydraulic pump, could also be performed. It is preferable that the corrective action be performed quickly so that disk brake system 10 can be returned to its normal operating state without any perceived disruption to the driver.

According to an optional feature, threshold 192 can be calibrated based on or more factors. For instance, if the ESC setting or some other vehicle mode setting gathered in step 102 indicates that the vehicle is currently in a 'sport' or 'performance' mode, then threshold 192 can be increased to account for the expectedly more aggressive driving.

Another optional feature is a throttle disablement feature. The throttle disablement feature uses the accelerator pedal position reading to determine if the driver is currently engaging the gas pedal. If the accelerator pedal is not depressed or is only depressed slightly, then the brake knockback corrective action in step 132 can be disabled or cancelled. This feature assumes that if the driver, particularly one driving in an aggressive sport mode or the like, rapidly transitions between braking and accelerating then they are less likely to notice the corrective action being taken in step 132. On the other hand, if the driver transitions from a turn onto a section of road where they are not engaging the accelerator pedal, it is more likely that they will notice or perceive the corrective action. It is sometimes desirable that the corrective action be as least intrusive or noticeable as possible.

It is also possible to vary the corrective action taken in step 132 based on the current driving conditions of the vehicle. For example, if the vehicle is in a low lateral acceleration or low vehicle speed environment where the driver is more likely to notice the hydraulic pump 72 turning on or other corrective actions, then the corrective action can be less aggressive but spread out over a greater amount of time. One way of manipulating the corrective action is by varying the pulse width modulated (PWM) signal sent to hydraulic pump 72. Also, if a braking event (manual or automatic) is already underway, then the corrective action in step 132 could be bypassed, skipped over, ignored, aborted, etc.

It is to be understood that the foregoing description is not a definition of the invention, but is a description of one or more preferred exemplary embodiments of the invention. The invention is not limited to the particular embodiment(s) disclosed herein, but rather is defined solely by the claims below. For instance, although the brake knockback model shown in FIG. 4 is a generally symmetric model having three linear segments (segments 160, 162, 164), it is possible to have a brake knockback model that: is asymmetrical, has more or less than three segments, has non-linear segments (e.g., concave, convex, or otherwise curved segments), or is arranged according to any other shape that is apparent to those skilled in the art. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A system for correcting brake knockback in a vehicle, comprising:
    a sensor having an output that provides a lateral acceleration signal, the lateral acceleration signal includes information regarding a lateral acceleration of the vehicle;
    an electronic module having an input coupled to the sensor output, an electronic processing device, an electronic memory device, and an output that provides a command signal; and
    a hydraulic pump for pressurizing hydraulic fluid in a vehicle disk brake system according to the command signal in order to correct brake knockback, wherein the electronic module is configured to: use the lateral acceleration signal to identify a first lateral acceleration extremity in a first direction, use the lateral acceleration signal to identify a second lateral acceleration extremity in a second direction, add a brake knockback associated with the first lateral acceleration extremity to a brake knockback associated with the second lateral acceleration extremity to estimate a total brake knockback, and generating the command signal based on the total brake knockback.

2. The system of claim 1, wherein the electronic module uses a first-order low-pass filter to process the lateral acceleration signal.

3. The system of claim 1, wherein the electronic module includes an additional input that is coupled to at least one of the sensors selected from the group consisting of: a wheel speed sensor, an accelerator pedal sensor, and a brake pedal sensor.

4. The system of claim 1, wherein the electronic module is an electronic brake control module (EBCM).

5. The system of claim 1, wherein the electronic memory device stores a brake knockback model, and the electronic module uses the information pertaining to the first and second lateral acceleration extremities and the brake knockback model to predict the total brake knockback.

6. The system of claim 5, wherein the brake knockback model is based on a lateral acceleration reference value that was obtained during a previous braking event.

7. The system of claim 5, wherein the brake knockback model includes a flat segment, a first sloped segment, and a second sloped segment.

8. A method for correcting brake knockback in a vehicle, comprising the steps of:
    (a) receiving lateral acceleration readings that are representative of a lateral acceleration of the vehicle, and using the lateral acceleration readings to determine a first lateral acceleration extremity that is representative of the greatest lateral acceleration experienced by the vehicle in a first direction and a second lateral acceleration extremity that is representative of the greatest lateral acceleration experienced by the vehicle in a second direction;
    (b) comparing the first and second lateral acceleration extremities to a brake knockback model, and estimating a total brake knockback based on the results of this comparison; and
    (c) generating a command signal for a hydraulic pump based on the estimated total brake knockback, wherein the hydraulic pump works with a disk brake system on the vehicle to correct brake knockback.

9. The method of claim 8, wherein step (a) further comprises receiving the lateral acceleration readings and using a first-order low-pass filter to process the lateral acceleration readings before performing step (b).

10. The method of claim 8, wherein the brake knockback model of step (b) is based on a lateral acceleration reference value that was obtained during a previous braking event.

11. The method of claim 8, wherein the brake knockback model of step (b) includes a flat segment, a first sloped segment extending from a first end of the flat segment, and a second sloped segment extending from a second end of the flat segment.

12. The method of claim 11, wherein the flat segment is a dead band that surrounds a lateral acceleration reference value and takes into account small lateral accelerations that will not likely result in brake knockback that is discernable to the driver.

13. The method of claim 11, wherein the first sloped segment is representative of lateral acceleration in a driver's side direction, and the second sloped segment is representative of lateral acceleration in a passenger's side direction.

14. The method of claim 8, wherein step (a) further comprises comparing the lateral acceleration readings with previously saved first and second lateral acceleration extremities and if the lateral acceleration readings are greater in magnitude than either of the lateral acceleration extremities, then saving the lateral acceleration readings as a new lateral acceleration extremity.

15. The method of claim 14, wherein step (b) further comprises adding an estimated brake knockback from the first lateral acceleration extremity to an estimated brake knockback from the second lateral acceleration extremity to determine the total brake knockback estimate.

16. The method of claim 15, wherein step (b) further comprises comparing the total brake knockback estimate to a threshold, and if the total brake knockback estimate is greater than the threshold then performing step (c).

17. The method of claim of claim 16, wherein the threshold can be calibrated or modified based on a vehicle mode setting.

18. The method of claim of claim 8, further comprising the step of:
(d) receiving at least one of an accelerator pedal position signal and a brake pedal position signal, and disabling step (c) based on the at least one signal.

19. A method for correcting brake knockback in a vehicle, comprising the steps of:
(a) receiving lateral acceleration readings that are representative of a lateral acceleration of the vehicle, and evaluating the lateral acceleration readings to determine a lateral acceleration extremity that is representative of a lateral acceleration experienced by the vehicle and is saved in an electronic memory;
(b) comparing the saved lateral acceleration extremity to a brake knockback model, and estimating a brake knockback based on the results of this comparison;
(c) using the estimated brake knockback to generate a command signal for a hydraulic pump, wherein the hydraulic pump works with a disk brake system on the vehicle to correct brake knockback; and
(d) detecting a subsequent braking event during which it is assumed that there is no brake knockback, clearing the saved lateral acceleration extremity from the electronic memory in response to the subsequent braking event, and evaluating additional lateral acceleration readings after clearing the saved lateral acceleration extremity so that a new lateral acceleration extremity can be established.

* * * * *